United States Patent
Brown et al.

[11] Patent Number: 5,975,050
[45] Date of Patent: Nov. 2, 1999

[54] METHOD FOR DETERMINING THE ENERGY CONTENT OF A FUEL DELIVERED TO AN ENGINE

[75] Inventors: Scott C. Brown, Peoria; Eric W. Ohlson, Edelstein, both of Ill.; Martin L. Willi, Lafayette, Ind.

[73] Assignee: Caterpillar Inc., Peoria, Ill.

[21] Appl. No.: 09/036,110

[22] Filed: Mar. 6, 1998

[51] Int. Cl.$^6$ .......................... F02D 41/00; F02M 21/02
[52] U.S. Cl. ...................... 123/350; 123/27 GE
[58] Field of Search ................... 123/350, 352, 123/526, 27 GE

[56] References Cited

U.S. PATENT DOCUMENTS

| | | | |
|---|---|---|---|
| 4,597,364 | 7/1986 | Young | 123/27 GE |
| 4,641,625 | 2/1987 | Smith | 123/575 |
| 4,955,326 | 9/1990 | Helmich | 123/27 GE |
| 5,136,986 | 8/1992 | Jensen | 123/27 GE |
| 5,140,959 | 8/1992 | Durbin | 123/304 |
| 5,150,685 | 9/1992 | Porter et al. | 123/478 |
| 5,224,457 | 7/1993 | Arsenault et al. | 123/526 |
| 5,226,396 | 7/1993 | Bailey | 123/494 |
| 5,398,724 | 3/1995 | Vars et al. | 137/625.33 |
| 5,450,829 | 9/1995 | Beck | 123/435 |
| 5,526,786 | 6/1996 | Beck et al. | 123/357 |

*Primary Examiner*—Tony M. Argenbright
*Assistant Examiner*—Arnold Castro

[57] ABSTRACT

A method for adjusting a fuel control system of an engine capable of operating in both a first mode during which only a first fuel is delivered to the engine and a second mode during which both the first fuel and a second fuel are delivered to the engine includes operating the engine in the first mode during which a governor output value ($X_{M1}$) is established and stored in memory. The engine is then operated in the second mode during which a governor output value ($X_{M2}$) is established. The governor output value ($X_{M2}$) is compared with the stored governor output value ($X_{M1}$) and a stored second fuel energy content value is adjusted based upon the comparison. The actual energy content of the second fuel can also be directly calculated.

16 Claims, 4 Drawing Sheets

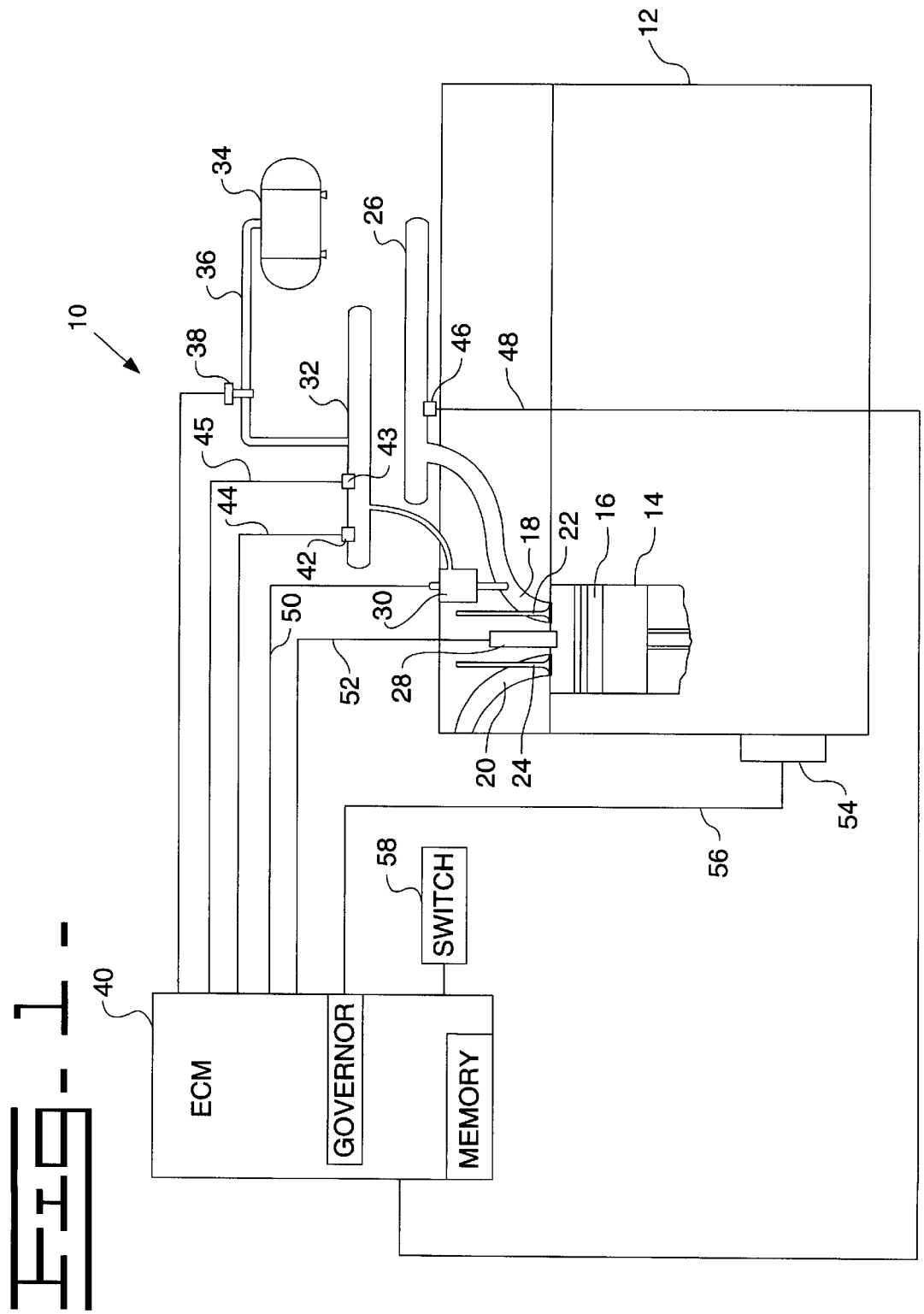

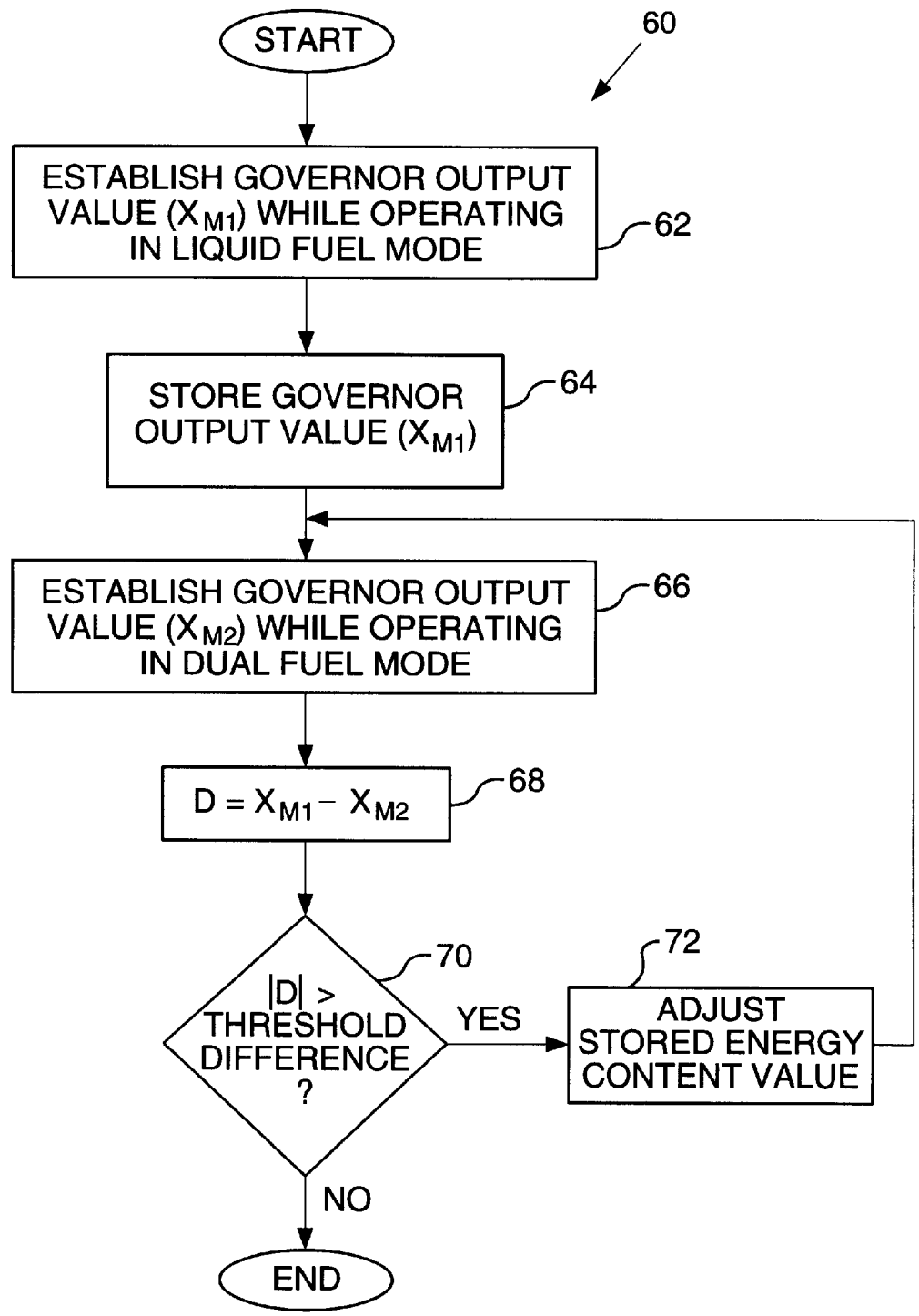

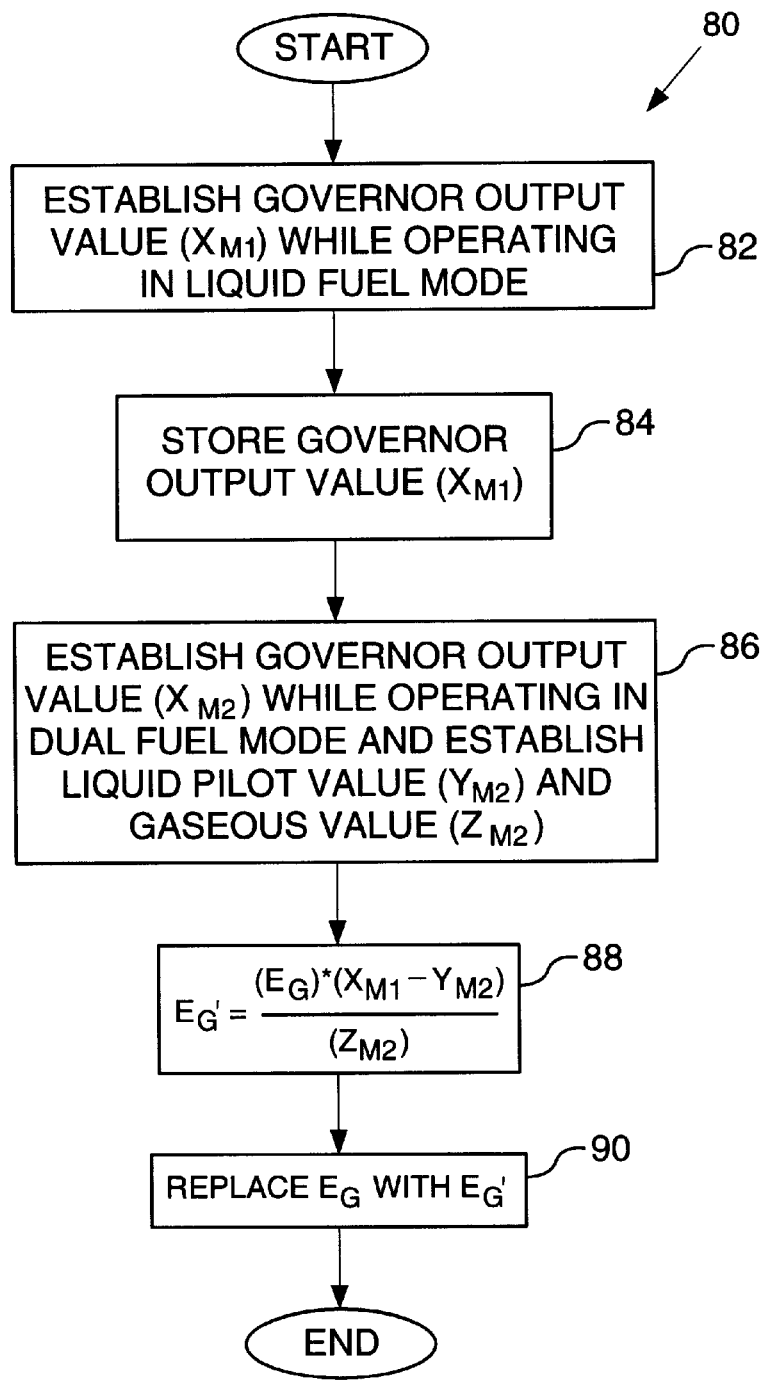

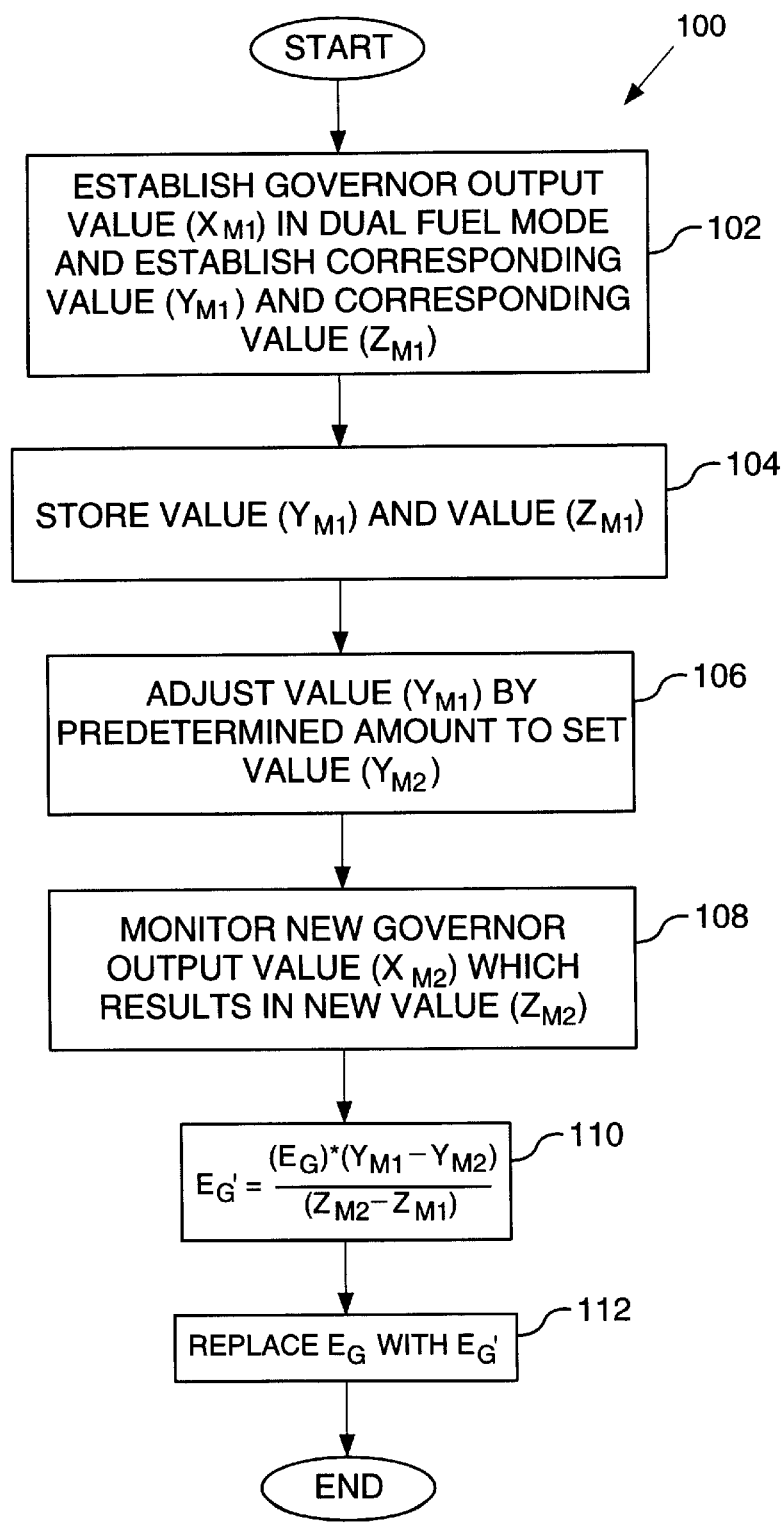

METHOD FOR DETERMINING THE ENERGY CONTENT OF A FUEL DELIVERED TO AN ENGINE

TECHNICAL FIELD

This invention relates generally to internal combustion engine systems capable of controllably delivering two fuels to the engine for simultaneous combustion, and more particularly, to a method for determining the energy content of one of the fuels delivered to an internal combustion engine in order to account for variations which can occur in the energy content of such fuel.

BACKGROUND ART

Internal combustion engines can be configured in a variety of ways to burn a mix or blend of two fuels. For example, a spark-ignited engine system can include a first valve for controllably delivering a known mass flow of a first fuel to an engine cylinder and a second valve for controllably delivering a known mass flow of a second fuel to an engine cylinder, the two fuels being simultaneously ignited by a spark plug disposed within the cylinder. An engine can also be configured as a dual fuel engine. Although the description contained herein is directed mainly to dual fuel engines it is recognized that the described methods are applicable to other types of engines which burn a blend of two fuels.

A dual fuel engine can typically operate in two modes. In a strictly liquid fuel mode a liquid fuel, such as diesel fuel, is injected directly into an engine cylinder or a precombustion chamber as the sole source of energy during combustion. In a dual fuel mode a gaseous fuel, such as natural gas, is mixed with air in an intake port of a cylinder and a small amount or pilot amount of diesel fuel is injected into the cylinder or the precombustion chamber in order to ignite the mixture of air and gaseous fuel.

A liquid fuel such as diesel fuel has a substantially constant energy content. However, the energy content of a gaseous fuel such as natural gas can vary. It is desirable that a dual fuel engine fuel control system which utilizes gaseous fuel energy content to determine the amount of gaseous fuel to deliver to the engine should be able to account for variations in the gaseous fuel energy content. Similarly, in a spark-ignited engine the energy content of a first fuel may be substantially constant, or at least always known based upon measurement by a gas chromatograph for example, and the energy content of a second fuel may be variable.

Accordingly, the present invention is directed to overcoming one or more of the problems as set forth above.

DISCLOSURE OF THE INVENTION

In one aspect of the present invention a method for adjusting a fuel control system of an engine capable of operating in both a first mode during which only a first fuel is delivered to the engine and a second mode during which both the first fuel and a second fuel are delivered to the engine is provided. The fuel control system utilizes a stored second fuel energy content value ($E_{F2}$) to determine the necessary duration of a second fuel valve control signal during engine operation in the second mode. The method includes operating the engine in the first mode during which a governor output value ($X_{M1}$) is established and stored in memory. The engine is then operated in the second mode during which a governor output value ($X_{M2}$) is established. The governor output value ($X_{M2}$) is compared with the stored governor output value ($X_{M1}$) and the stored second fuel energy content value ($E_{F2}$) is adjusted based upon the comparison.

In another aspect of the present invention a method of determining the energy content of a second fuel delivered to an engine system capable of operating in both a first mode during which only a first fuel is delivered to the engine and a second mode during which both the first fuel and the second fuel are delivered to the engine is provided. The engine system utilizes a stored second fuel energy content value ($E_{F2}$) to determine the necessary duration of a second fuel valve control signal during engine operation in the second mode. The method includes operating the engine in the first mode during which a governor output value ($X_{M1}$) is established and stored in memory. The engine is then operated in the second mode during which a governor output value ($X_{M2}$) is established and during which a first fuel value ($Y_{M2}$) is established and a second fuel value ($Z_{M2}$) is established such that $X_{M2}=Y_{M2}+Z_{M2}$. An updated second fuel energy content value ($E_{F2}'$) can then be calculated.

In another aspect of the present invention a method for determining the energy content of a second fuel delivered to an engine wherein the energy content of a first fuel delivered to the engine is known is provided. A fuel control system of the engine utilizes a stored second fuel energy content value ($E_{F2}$) to determine the necessary duration of a second fuel valve control signal when both fuels are being delivered to the engine. The method includes providing a fuel system governor which continuously outputs a value (X) indicative of a total fuel energy rate being delivered to the engine. A first governor output value ($X_{M1}$) is established while both the first fuel and the second fuel are being delivered to the engine and a first fuel value ($Y_{M1}$) and a second fuel value ($Z_{M1}$) are established such that $X_{M1}=Y_{M1}+Z_{M1}$. The first fuel value ($Y_{M1}$) and the second fuel value ($Z_{M1}$) are stored. The first fuel value ($Y_{M1}$) is changed to a value ($Y_{M2}$) and a governor output value ($X_{M2}$) and a second fuel value ($Z_{M2}$) are established such that $X_{M2}=Y_{M2}+Z_{M2}$. An updated energy content value ($E_{F2}'$) can then be calculated.

With respect to each aspect of the present invention, in the preferred embodiments the engine is a dual fuel engine and the first fuel is a liquid fuel, the second fuel is a gaseous fuel, the first mode is a liquid fuel mode, the second mode is a dual fuel mode, and the second fuel valve control signal is a gaseous fuel admission valve control signal.

BRIEF DESCRIPTION OF THE DRAWINGS

For a better understanding of the present invention, reference may be made to the accompanying drawings in which:

FIG. 1 is a schematic view of a dual fuel engine system in accordance with the present invention;

FIG. 2 is a flowchart of operating steps for the dual fuel engine system of FIG. 1 in accordance with one aspect of present invention;

FIG. 3 is a flowchart of operating steps for the dual fuel engine system of FIG. 1 in accordance with a second aspect of the present invention; and FIG. 4 is a flowchart of operating steps for the dual fuel engine system of FIG. 1 in accordance with a third aspect of the present invention.

BEST MODE FOR CARRYING OUT THE INVENTION

Referring to the drawings, numeral 10 in FIG. 1 depicts a dual fuel engine system including an engine 12 with a representative cylinder 14 shown. Although only one cylinder 14 is shown, it is recognized that number of cylinders of engine 12 could vary and that engine 12 could be of the in-line type, v-type, or even a rotary type engine. Piston 16 is positioned for displacement within cylinder 14, which cylinder 14 includes an intake port 18 and an exhaust port 20 including respective valves 22 and 24. Intake port 18 receives air from an air intake manifold 26 to which intake air travels after passing through, for example, an air filter (not shown) and turbocharger (not shown). Engine 12 includes a fuel injector 28, such as an electronic unit injector, positioned for injecting liquid fuel, such as diesel fuel, into cylinder 14. The liquid fuel may be provided to fuel injector 28 by means commonly known in the art. A gaseous fuel admission valve 30 is positioned between a gaseous fuel manifold 32 at an upstream side and intake port 18 at a downstream side, a nozzle portion of valve 30 extending into intake port 18 for delivering gaseous fuel thereto. Gaseous fuel admission valve 30 may, for example, be of the type shown and described in U.S. Pat. No. 5,398,724 available from Woodward Governor Company. Gaseous fuel manifold 32 is connected to a source of gaseous fuel 34 by fuel path 36, a solenoid operated gaseous fuel shut off valve 38 being positioned along fuel path 36. Although not shown, it is recognized that such a system might typically include a balance regulator positioned between gaseous fuel source 34 and gaseous fuel manifold 32 for regulating the gaseous fuel pressure at the upstream side of gaseous fuel admission valve 30.

An electronic control module (ECM) 40 is connected to a gaseous fuel pressure sensor 42 via conductive path 44 and to an intake air pressure sensor 46 via conductive path 48 for receiving pressure indicative signals from each of such sensors. Such pressure sensors are well known in the art and therefore a detailed description of the sensors is not included herein. A temperature sensor 43 is also provided in gaseous fuel manifold 32 to provide temperature indicative signals to ECM 40 via conductive path 45. ECM 40 is connected for controlling gaseous fuel admission valve 30 by conductive path 50 and is also connected for controlling fuel injector 28 by conductive path 52. In this regard it is know to include driver circuitry within ECM 40 for delivering current control signals to such devices. However, it is recognized that such driver circuitry could be formed separate from, but connected to, ECM 40. An engine speed sensor 54 associated with a camshaft of engine 12 is also connected to ECM 40 via conductive path 56 for delivering engine speed indicative signals thereto. ECM 40 typically includes processing means, such as a microcontroller or microprocessor, associated electronic circuitry such as input/output circuitry, as well as associated memory.

Dual fuel engine system 10 can operate in both a liquid fuel mode and a dual fuel mode. In the liquid fuel mode the liquid fuel is injected into engine cylinder 14 as the sole source of fuel energy during combustion. In a dual fuel mode the gaseous fuel is mixed with air in intake port 18 of cylinder 14 and a small amount or pilot amount of liquid fuel is injected into cylinder 14 in order to ignite the mixture of air and gaseous fuel.

The fuel control system of engine 12 operates by establishing a governor output value (X) indicative of a total fuel energy rate desired to be delivered to the engine to maintain a desired engine speed. The desired engine speed may be a predetermined, stored engine speed or it may be indicated by a throttle setting for example. A first value (Y) indicative of a liquid pilot fuel energy rate desired to be delivered to the engine and a second value (Z) indicative of a gaseous fuel energy rate desired to be delivered to the engine are each determined such that the sum of the desired liquid pilot fuel energy rate and the desired gaseous fuel energy rate is substantially equal to the desired total fuel energy. A fuel injector control signal duration and a gaseous fuel admission valve control signal duration are both determined such that the liquid fuel delivered to the engine provides the desired liquid pilot fuel energy rate and the gaseous fuel delivered to the engine provides the desired gaseous fuel energy rate. The gaseous fuel admission valve control signal duration corresponding to gaseous fuel value (Z) is determined by an appropriate calculation which takes into account the gaseous fuel pressure, the intake air pressure, a gaseous fuel manifold temperature, the stored gaseous fuel energy content value ($E_G$), and the known flow characteristics of gaseous fuel admission valve 30 in accordance with the following equation:

$$\text{GASDURATION}_Z = [(Z \cdot K_1 \cdot E_L)/(N_I \cdot S \cdot E_G \cdot F_G)] + t_C,$$

where Z (mm) is a rack value, $K_1$ (g/mm·min) is a predetermined constant for converting rack to a liquid fuel flow rate, $E_L$ (J/g) is the energy content of the liquid fuel, $N_I$ (inj/rev) is the number of injections per engine revolution, S (rev/min) is the engine speed, $E_G$ (J/g) is the stored gaseous fuel energy content, $F_G$ (g/sec) is the flow rate of the gaseous fuel admission valve, and $t_C$ (sec) is an offset to account for mechanical delays and reduced flow for gaseous fuel admission valve 30 during valve opening and closing. With respect to liquid pilot value (Y) and gaseous fuel value (Z), value (Y) is determined as a function of engine speed and engine load and value (Z) is defined as the $Z = X - Y$.

Referring to FIG. 2, a flowchart 60 of operating steps in accordance with one aspect of the present invention is shown. Engine 12 is operated in a liquid fuel mode and a governor output value ($X_{M1}$) indicative of the total fuel energy rate being delivered to the engine is established at step 62. The governor output value ($X_{M1}$) is stored for later retrieval at step 64. Thereafter, while the engine is operating in a dual fuel mode a governor output value ($X_{M2}$) is established as indicated at step 66. The difference (D) between value ($X_{M1}$) and value ($X_{M2}$) is determined at step 68 and the difference (D) is compared with a threshold difference at step 70. If the absolute value of difference (D) exceeds the threshold difference then the stored energy content value ($E_G$) is adjusted at step 72.

As noted above, the stored energy content value ($E_G$) is used to determine the necessary duration of the gaseous fuel admission valve control signal. Further, the fuel control system is configured to provide a substantially constant total fuel energy rate to the engine regardless of the engine operating mode as long as the engine load remains substantially constant. Accordingly, when the difference between governor output value ($X_{M1}$) in the liquid fuel mode and the governor output value ($X_{M2}$) in the dual fuel mode is significant, such is indicative of the stored gaseous fuel energy content value ($E_G$) being incorrect. The stored gaseous fuel energy content value ($E_G$) is therefore adjusted at step 72 when the absolute value of difference (D) exceeds the threshold difference, which threshold difference may be established by engine testing. Because the described method is based upon the engine load remaining substantially constant it is recognized that monitoring of the engine load should preferably be performed before making an adjustment to the stored gaseous fuel energy content value ($E_G$). For example, simultaneous with steps 62 and 64 the engine load may be monitored and stored in memory as ($L_{M1}$). Once the engine is operating in the dual fuel mode, before making an energy content adjustment the engine load ($L_{M2}$) may again be monitored and compared with the stored engine load ($L_{M1}$). If the difference between the two load values ($L_{M1}$) and ($L_{M2}$) is less than a predetermined amount, then the energy content adjustment can be made if necessary. However, if the difference between the two load values ($L_{M1}$) and ($L_{M2}$) is too large, it would be preferable to first transition to the liquid fuel mode so that a new governor output value ($X_{M1}'$) can be established and stored. Engine operation can then be transitioned back to the dual fuel mode to perform the energy content adjustment in accordance with steps 68, 70 and 72. In terms of load monitoring, if the dual fuel engine is being used in a generator application a power feedback signal could be monitored as a load indicator. Further, if the dual fuel engine is being used in a pump application then engine speed could be monitored as a load indicator.

With regard to step 72, the adjustment of the stored gaseous fuel energy content value ($E_G$) may be made in a variety of ways. As a general matter, if the difference (D) determined at step 68 is negative such is indicative of the stored gaseous fuel energy content value ($E_G$) being too high. If the difference (D) is positive such is indicative of the stored gaseous fuel energy content value ($E_G$) being too low. Accordingly, the stored gaseous fuel energy content value ($E_G$) is decreased at step 72 if ($X_{M2}$) is greater than ($X_{M1}$) and the stored gaseous fuel energy content value ($E_G$) is increased at step 72 if ($X_{M2}$) is less than ($X_{M1}$). The stored gaseous fuel energy content value ($E_G$) can be increased/decreased by a predetermined amount, such as by a predetermined percentage, or the gaseous fuel energy content can be increased/decreased by an amount which is a function of the difference (D). Steps 66, 68, 70 and 72 could be repeated until the absolute value of the difference (D) falls below the threshold difference.

In another aspect of the present invention the actual energy content of the gaseous fuel is calculated directly performing the steps set out in flowchart 80 of FIG. 3. Steps 82 and 84 of FIG. 3 correspond to steps 62 and 64 of FIG. 2. At step 86 a governor output value ($X_{M2}$) is established in the dual fuel mode. A liquid pilot fuel value ($Y_{M2}$) and a gaseous fuel value ($Z_{M2}$) are also established such that $X_{M2}=Y_{M2}+Z_{M2}$. An updated gaseous fuel energy content value ($E_G'$) can then be determined in accordance with the equation set forth in step 88 and at step 90 the stored gaseous fuel energy content value ($E_G$) is then replaced with the updated gaseous fuel energy content value ($E_G'$). The method of FIG. 3 again assumes a constant engine load and therefore it is desirable to monitor the engine load as described with respect to the method of FIG. 2. With respect to step 90, it is recognized that if the updated gaseous fuel energy content value ($E_G'$) is significantly different than the stored gaseous fuel energy content value ($E_G$) it may be desirable to adjust the stored value ($E_G$) in a series of incremental steps.

Referring now to FIG. 4, another aspect of the present invention is depicted by flowchart 100. While the engine is operating in the dual fuel mode a governor output value ($X_{M1}$) indicative of the total fuel energy rate is established at step 102. Corresponding liquid pilot fuel value ($Y_{M1}$) and gaseous fuel value ($Z_{M1}$) are also established such that $X_{M1}=Y_{M1}+Z_{M1}$. The value ($Y_{M1}$) and the value ($Z_{M1}$) are stored in memory at step 104 for later retrieval. At step 106 the liquid pilot fuel value ($Y_{M1}$) is increased/decreased by a predetermined amount to ($Y_{M2}$). This change will result in a new gaseous fuel value ($Z_{M2}$) at step 108 and, if the stored gaseous fuel energy value ($E_G$) is incorrect, a new governor output value ($X_{M2}$) such that $X_{M2}=Y_{M2}+Z_{M2}$. An updated gaseous fuel energy content value ($E_G'$) can then be calculated in accordance with the equation set forth in step 110, and the stored gaseous fuel energy content value ($E_G$) can the be replaced with the updated gaseous fuel energy content value ($E_G'$) as indicated at step 112. The method of FIG. 4 again assumes a constant engine load and therefore it is desirable to monitor the engine load to assure that the load remains constant during the steps of FIG. 4. With respect to step 112, it is again recognized that if the updated gaseous fuel energy content value ($E_G'$) is significantly different than the stored gaseous fuel energy content value ($E_G$) it may be desirable to adjust the stored value ($E_G$) in a series of incremental steps.

INDUSTRIAL APPLICABILITY

The present invention enables the gaseous fuel energy content of a gaseous fuel to be determined during engine operation such that proper gaseous fuel delivery to the engine can be maintained during dual fuel engine operation. In a dual fuel engine application utilizing natural gas such energy content determination is necessary as the energy content of natural gas can vary significantly. The energy content adjustment can be performed as necessary or desired in a given application. For example, the energy content adjustment could be performed on a predetermined periodic basis or the energy content adjustment could be performed whenever the governor output value (X) in the dual fuel mode changes a significant amount.

The described methods could also be utilized in association with other types of engines which burn a mix of two fuels. For example, a spark-ignited engine may include two gaseous fuel admission valves for each cylinder for controllably delivering two different gaseous fuels to each cylinder. Such an engine would be capable of delivering a first fuel having a known energy content and a second fuel having a variable energy content. A stored second fuel energy content value ($E_{F2}$) might be utilized for determining the necessary duration of a second fuel valve control signal. The value (Y) would correspond to the first fuel and the value (Z) would correspond to the second fuel. An updated energy content value ($E_{F2}'$) could be calculated using the equations of FIGS. 3 and 4 where term ($E_{F2}$) is substituted for term ($E_G$) in the equations and term ($E_{F2}'$) is substituted for term ($E_G'$) in the equations.

In terms of the stored energy content value ($E_G$) or ($E_{F2}$), it is recognized that such value could be an energy per unit mass such as (J/g) or such value could be an energy per unit volume such as (J/m$^3$). It is also anticipated that steps in accordance with the present invention could be incorporated into the processing means of ECM 40 using a variety of known programming techniques.

Other aspects, objects and advantages of the present invention can be obtained from a study of the drawings, the disclosure and the appended claims.

We claim:

1. A method for adjusting a fuel control system of an engine capable of operating in both a first mode during which only a first fuel is delivered to the engine and a second mode during which both the first fuel and a second fuel are delivered to the engine, the fuel control system utilizing a stored second fuel energy content value ($E_{F2}$) to determine the necessary duration of a second fuel valve control signal during engine operation in the second mode, an energy content of the first fuel being known, the method comprising the steps of:

(a) operating the engine in the first mode during which a governor output value ($X_{M1}$) is established and stored in memory;

(b) operating the engine in the second mode during which a governor output value ($X_{M2}$) is established;

(c) comparing the governor output value ($X_{M2}$) with the stored governor output value ($X_{M1}$); and (d) adjusting the stored second fuel energy content value ($E_{F2}$) based upon the comparison made in step (c).

2. The method, as set forth in claim 1, wherein:

step (c) includes determining a difference (D) between the stored governor output value ($X_{M1}$) and the governor output value ($X_{M2}$); and step (d) is only performed when the absolute value of the difference (D) exceeds a threshold difference.

3. The method, as set forth in claim 2, wherein steps (b), (c), and (d) are repeated until the absolute value of the difference (D) no longer exceeds the threshold difference.

4. The method, as set forth in claim 2, wherein:

step (d) includes adjusting the stored second fuel energy content value ($E_{F2}$) by an amount which is a function of the difference (D).

5. The method, as set forth in claim 1, wherein:

step (d) includes adjusting the stored second fuel energy content value ($E_{F2}$) by a predetermined amount.

6. The method, as set forth in claim 1, wherein:

step (d) includes increasing the stored second fuel energy content value ($E_{F2}$) if the governor output value ($X_{M2}$) is at least a predetermined amount less than the stored governor output value ($X_{M1}$).

7. The method, as set forth in claim 6, wherein:

step (d) includes decreasing the stored second fuel energy content value ($E_{F2}$) if the governor output value ($X_{M2}$) is at least a predetermined amount greater than the stored governor output value ($X_{M1}$).

8. The method, as set forth in claim 1, including the steps of:

(e) sensing an engine load ($L_{M1}$) at the time the stored governor output value ($X_{M1}$) is established in step (a);

(f) storing the sensed engine load ($L_{M1}$);

(g) sensing an engine load ($L_{M2}$) at the time step (b) is performed;

(h) comparing the sensed engine load ($L_{M2}$) to the stored engine load ($L_{M1}$); and (i) performing step (d) only if the engine load ($L_{M2}$) is substantially the same as the stored engine load ($L_{M1}$).

9. The method, as set forth in claim 1, wherein the engine is a dual fuel engine and wherein the first fuel is a liquid fuel, the second fuel is a gaseous fuel, the first mode is a liquid fuel mode, the second mode is a dual fuel mode, and the second fuel valve control signal is a gaseous fuel admission valve control signal.

10. A method of determining the energy content of a second fuel delivered to an engine system capable of operating in both a first mode during which only a first fuel is delivered to the engine and a second mode during which both the first fuel and the second fuel are delivered to the engine, the engine system utilizing a stored second fuel energy content value ($E_{F2}$) to determine the necessary duration of a second fuel valve control signal during engine operation in the second mode, an energy content of the first fuel being known, the method comprising the steps of:

(a) operating the engine in the first mode during which a governor output value ($X_{M1}$) is established and stored in memory;

(b) operating the engine in the second mode during which a governor output value ($X_{M2}$) is established and during which a first fuel value ($Y_{M2}$) is established and a second fuel value ($Z_{M2}$) is established such that:

$$X_{M2}=Y_{M2}+Z_{M2}; \text{ and}$$

(c) calculating an updated second fuel energy content value ($E_{F2}'$) in accordance with the following equation:

$$E_{F2}'=(E_{F2})\cdot(X_{M1}-Y_{M2})/(Z_{M2}).$$

11. The method, as set forth in claim 10, including the step of:

(d) replacing the stored second fuel energy content value ($E_{F2}$) with the updated second fuel energy content value ($E_{F2}'$).

12. The method, as set forth in claim 10, wherein the engine is a dual fuel engine and wherein the first fuel is a liquid fuel, the second fuel is a gaseous fuel, the first mode is a liquid fuel mode, the second mode is a dual fuel mode, and the second fuel valve control signal is a gaseous fuel admission valve control signal.

13. The method, as set forth in claim 10, wherein steps (a) and (b) are performed at substantially the same engine load.

14. A method for determining the energy content of a second fuel delivered to an engine wherein the energy content of a first fuel delivered to the engine is known, a fuel control system of the engine utilizing a stored second fuel energy content value ($E_{F2}$) to determine the necessary duration of a second fuel valve control signal when both fuels are being delivered to the engine, the method comprising the steps of:

(a) providing a fuel system governor which continuously outputs a value (X) indicative of a total fuel energy rate being delivered to the engine;

(b) establishing a first governor output value ($X_{M1}$) while both the first fuel and the second fuel are being delivered to the engine and establishing a first fuel value ($Y_{M1}$) and a second fuel value ($Z_{M1}$) such that:

$$X_{M1}=Y_{M1}+Z_{M1};$$

(c) storing the first fuel value ($Y_{M1}$) and storing the second fuel value ($Z_{M1}$);

(d) changing the first fuel value ($Y_{M1}$) to a value ($Y_{M2}$);

(e) establishing a governor output value ($X_{M2}$) and a second fuel value ($Z_{M2}$) such that:

$$X_{M2}=Y_{M2}+Z_{M2};$$

(f) calculating an updated energy content value ($E_{F2}'$) in accordance with the following equation:

$$E_{F2}'=(E_{F2})\cdot(Y_{M1}-Y_{M2})/(Z_{M2}-Z_{M1}).$$

15. The method, as set forth in claim 14, including the step of:

(g) replacing the stored energy content value ($E_{F2}$) with the updated energy content value ($E_{F2}'$).

16. The method, as set forth in claim 14, wherein the engine is a dual fuel engine and wherein the first fuel is a liquid fuel, the second fuel is a gaseous fuel, the first mode is a liquid fuel mode, the second mode is a dual fuel mode, and the second fuel valve control signal is a gaseous fuel admission valve control signal.

* * * * *